Figure 3A:
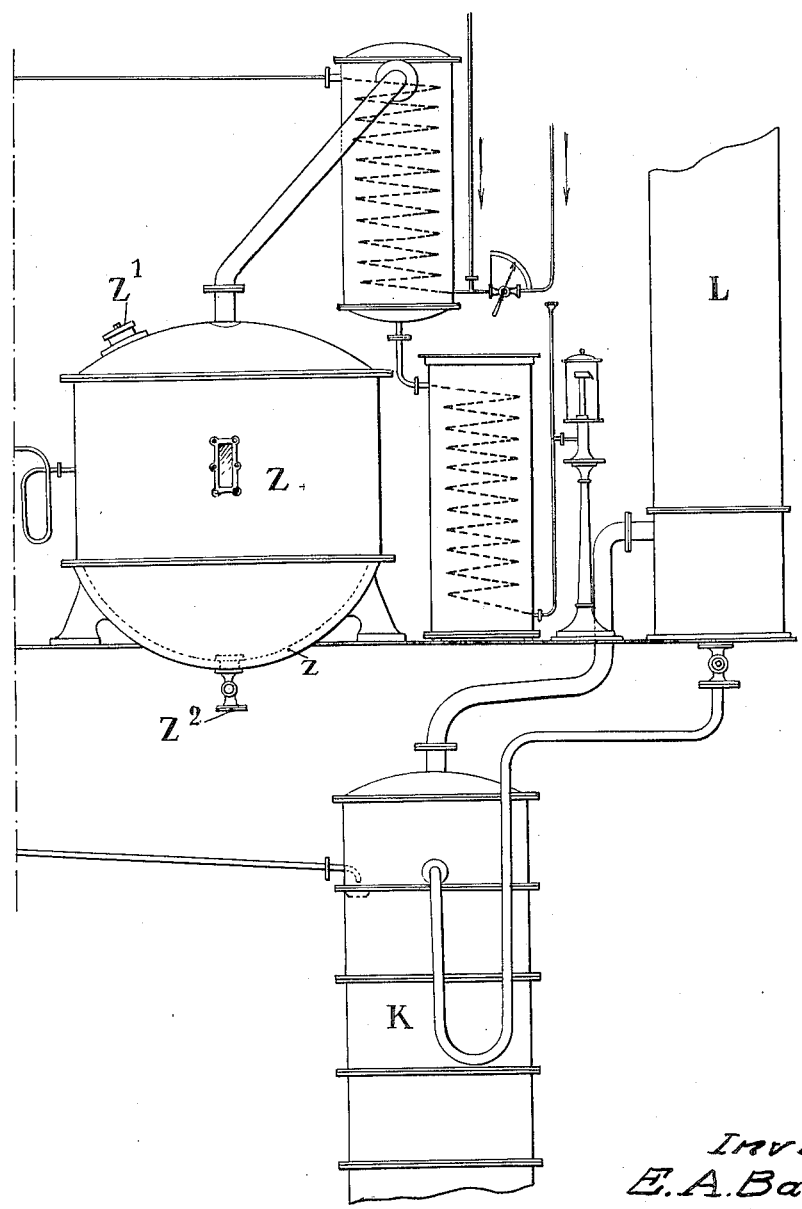

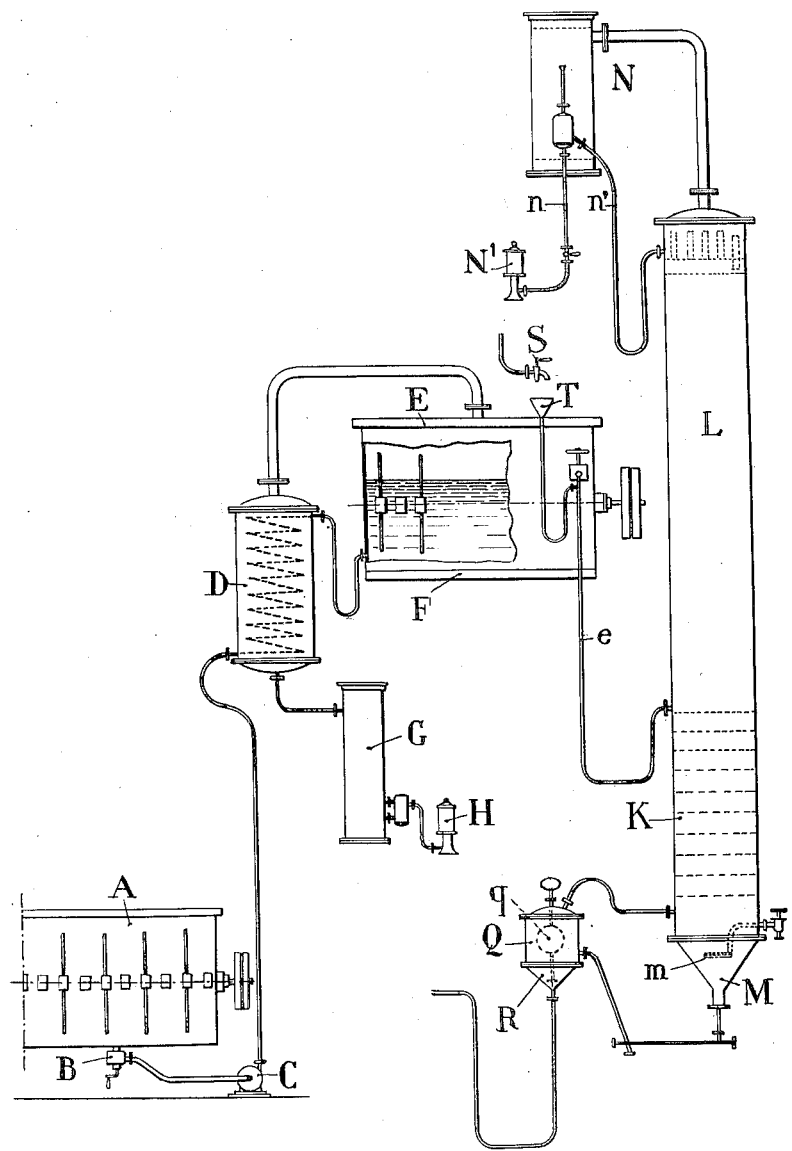

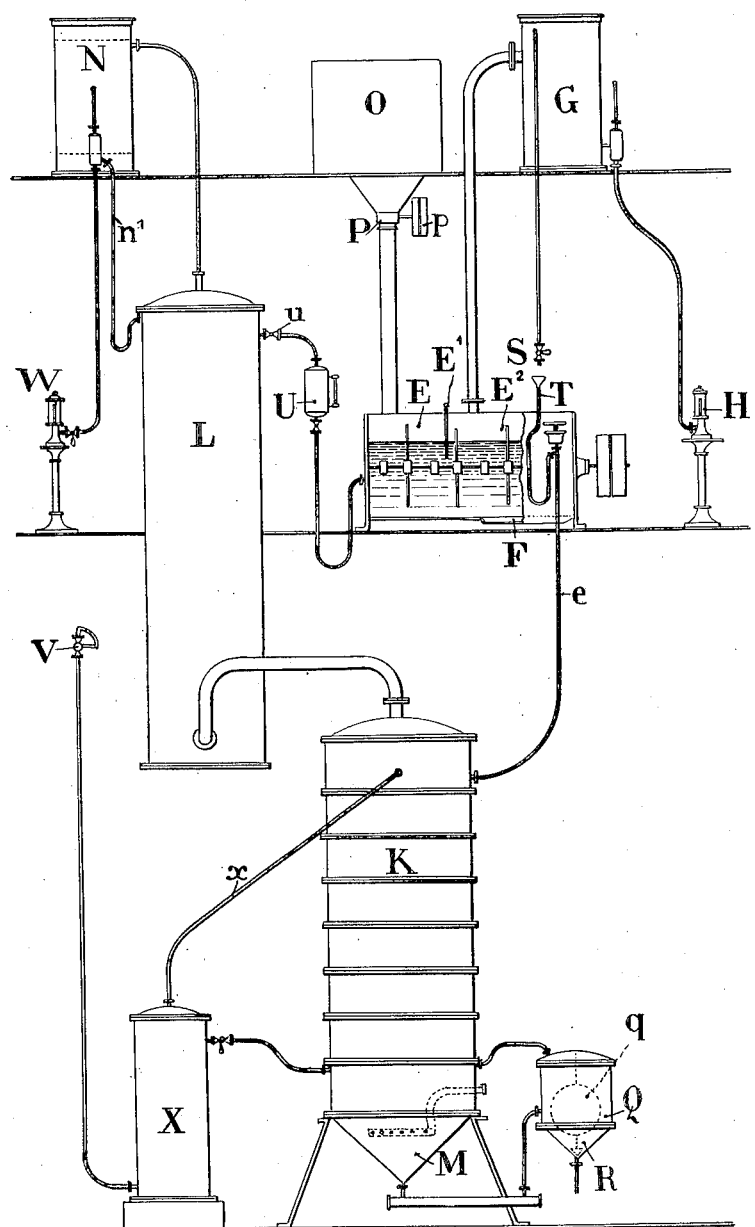

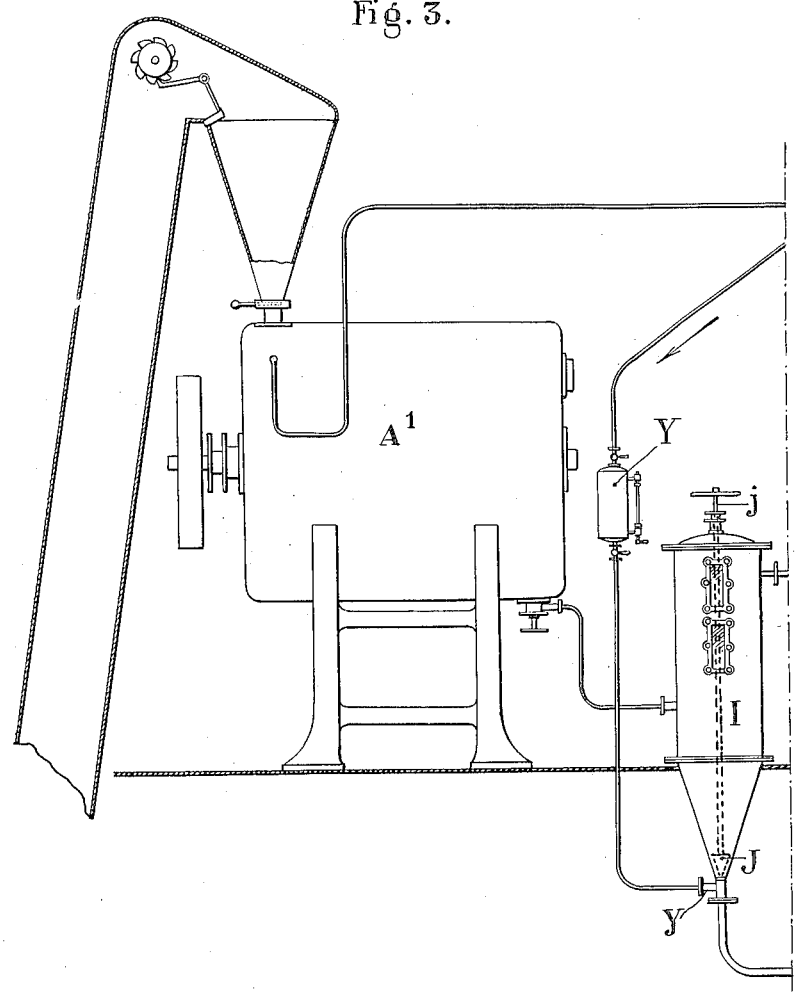

Aug. 31, 1926.

E. A. BARBET

REFINING ALCOHOL

Filed Nov. 14, 1922   4 Sheets-Sheet 4

1,598,548

Inventor
E. A. Barbet
Marker Clark
Attys

Patented Aug. 31, 1926.

1,598,548

UNITED STATES PATENT OFFICE.

EMILE AUGUSTIN BARBET, OF PARIS, FRANCE.

REFINING ALCOHOL.

Application filed November 14, 1922, Serial No. 600,971, and in France November 15, 1921.

This invention relates to the production of absolute alcohol.

The standard method of producing absolute alcohol consists in dehydrating rectified alcohol (of 95/96° Gay-Lussac), by means of quick lime in powder form. The operation is effected in a still provided with a steam jacket and furnished with an agitator. The quick lime and alcohol are caused to come into intimate contact with one another for a few hours before distillation by means of the agitator.

Owing to the great difficulty met with in expelling the alcohol from the mixture of lime powder and alcohol, the distilling operation is prolonged and the whole of the alcohol cannot be recovered.

The invention will be described in detail with reference to the accompanying drawings which illustrate by way of example suitable arrangements of apparatus, Figure 1 being a view in elevation partly in section of apparatus adapted to treat alcohol which has already been concentrated to 96° Gay-Lussac or thereabouts, and Figure 2 is a similar view of apparatus adapted for use in treating crude alcoholic liquors which are first concentrated to 96° Gay-Lussac and the alcohol of this strength is then further concentrated, while Figures 3 and 3ª illustrate a further alternative construction.

Referring to Figure 1, A is a large mixer for facilitating the action of the quick lime in powder form on the alcohol. In the figure, this mixer is horizontal, the sheet-iron bottom being semi-cylindrical. But any other known type of mixer may be adopted, provided it causes the lime to be thoroughly disseminated through the alcohol. Several of these mixers can be employed in order that their contents may be distilled in succession after the alcohol has been agitated with the solid dehydrating agent for a suitable period.

B is the valve through which the mixture is admitted to the pump C which delivers it to the reheating apparatus D. In Figure 1 the reheating apparatus comprises a coil and the heating is obtained by the alcohol vapours coming from the continuous still E.

Owing to the nature of the mixture, the still E is also provided with stirring arms, the semi-cylindrical bottom being heated by the steam jacket F. The vapours of absolute alcohol begin to condense in the heater D, and then the liquid and the remainder of the vapours cool in the cooler G (which is a tubular or coil cooler); finally the cold absolute alcohol flows away through the testing device H which is of known construction.

For rendering the operation continuous, only three-fourths or four-fifths of the alcohol entering the still E are distilled off therein; the mixture of alcohol and lime thickens as the alcohol is driven off but must remain sufficiently liquid so that permanently an excess issues through the pipe $e$ and proceeds towards the continuous exhauster K, L. It is advantageous to go as far as possible with this thickening action, so as to obtain the maximum quantity of absolute alcohol. With this object the mixture may be diluted immediately after issuing from the still E. A cock S is provided for the purpose of supplying a small stream of water which flows continuously through the funnel T and a siphon pipe into a pipe $e$ and dilutes the residue.

The exhauster apparatus K, L is intended not only to enable the entire alcohol content of the thickened mixture to be recovered, but also to raise this alcohol to about 96° so that it may return to the dehydrating apparatus A.

The lower section K is provided with bubbling plates which must be of such construction that they will not become coated with lime. One of the most practical types of plate is the perforated plate, as in this case the material over the entire surface is agitated and no deposition of solid material thereon can take place.

Many difficulties are obviated by the present invention as the base M is heated by means of a steam bubbler; the steam bubbles through the material on the plates and replaces the alcohol which is driven or forced towards the top of the column. The alcohol however becomes highly hydrated by the introduction of this water vapour and this is why there is arranged above the plates K an alcohol rectifying column L operating in known manner to secure a further concentration of the alcohol.

The recovered alcohol is raised to 96° Gay-Lussac. It flows through the pipe $n$ towards the testing device $N^1$. The excess refluxes through the pipe $n^2$ to the upper part of L.

The residual liquid of the bottom being rather thick, the necessary measures will have to be taken to avoid deposits and obstructions therein; to this end the bottom is made conical and all the lime sludge passes therefrom to the extractor Q which is of the float type. This extractor is adapted to maintain a constant level in the base M; the float $q$ controlling the exit valve R.

A simplification of the invention as illustrated in Figure 1 will now be described with reference to Figure 2 of the accompanying drawings.

With the plant shown in Figure 2 the previous treatment of the cold alcohol with quicklime is dispensed with and a single rectifying apparatus is used for the production of the alcohol at 96° which is to be dehydrated and at the same time for exhausting and revivifying the lime sludge issuing from the absolute alcohol still.

As shown in Figure 2, L is the single rectifier. The crude alcohol containing liquor, the rate of feed of which is controlled by the cock V, is heated in the tubular apparatus X which may receive its steam from the lower part of the column K. The hot crude alcoholic liquid rises by way of the pipe $x$ to the upper plate of the exhausting column K.

The vapours leaving the rectifying column L pass to the cooler condenser N, a portion of the condensate formed in which returns by way of the pipe $n'$ to the top plate of the column while a small proportion is withdrawn by way of the testing device W to prevent the accumulation of alhehydic impurities on the top plates of the column, from which they would ultimately pass to the still E E² where by contact with lime the aldehydes would be resinified, and to enable alcohol which has been subjected to re-ebullition on the top plates of the rectifying column and has been freed from its last traces of impurities (the so-called Pasteurized alcohol) to be withdrawn from the second or third plate of the column by way of the pipe $u$ whereas the remainder, which is the greater part, descends from plate to plate and rectifies the ascending alcoholic vapours. The Pasteurized alcohol thus drawn off is boiling. The testing device U serves for measuring the hourly volume which is drawn off and which is about to enter the absolute-alcohol still E E². This still is divided into two parts by a partition E'. The first portion E of the stirrer is not heated; it serves for mixing together and producing a sufficiently prolonged intimate contact of the boiling alcohol and lime. The high temperature accelerates the dehydration. The powdered quicklime is stored in a trough O. P is an automatic feeder working on a known principle; the plug of the tap P has a recess capable of containing a constant weight of powdered lime. When this recess is turned upwards it becomes filled with lime and when, by the action of the belt pulley $p$, the plug has made half a revolution the said recess discharges its contents into the dehydrator.

By increasing the number of revolutions per minute of the recessed cock P, the rate of feed of quicklime is increased. The quantity of reagent admitted can therefore be proportioned as desired and the cock forms at the same time a fluid-tight closure preventing any loss of alcohol vapour.

The right-hand portion E² of the mixer is provided with a double bottom F heated by steam, preferably exhaust steam. This constitutes the still which exactly operates as in Figure 1. G is a condenser, H the test device for the absolute alcohol, S the hot water cock for diluting the alcoholic lime sludge issuing through the pipe $e$. This alcoholic sludge, instead of being regenerated in a special rectifying column, as in Figure 1, passes to the single exhausting column K wherein it mixes with the crude unrectified alcoholic liquid and is exhausted of its alcohol at the same time as the latter. Naturally it is desirable that this exhausting column K should be provided with non-chokable plates as above referred to. The base M of this column and the outlet regulator Q for the milk of lime free from alcohol are identical to those of Figure 1.

The alcohol vapour recovered from the alcoholic lime sludges is subjected to rectification up to 96° Gay-Lussac in the column L.

Briefly it may be said that the plant illustrated in Figure 2 by reason of the accessory parts which it comprises, constitutes a continuous rectifier for crude and unrectified alcohol which instead of rectifying up to 96/97° Gay-Lussac effects immediately a continuous rectification up to 99/100° Gay-Lussac, this result being obtained by the addition of a dehydrating chemical reaction to the usual physical method of refining alcohols.

As will be understood, the dehydration of the alcohol by the lime can be rendered continuous only by solving the difficulty of the dry exhaustion of the residual lime. In the process described, the lime is freed from its alcohol by direct bubbling of water vapour, which maintains it in the form of a fluid mass and in a condition adapted to permit its extraction continuously. From this derives the necessity of dividing the operation in two phases and the small inconvenience of obtaining only about the three-fourths or the four-fifths of the alcohol in the pure condition, the remainedr being only at 96° and must return to the dehydration. But, on the other hand, the operation can give daily hundreds of hectolitres of pure alcohol in a single apparatus and the losses of alcohol are nil.

It is possible to operate in a simpler manner by using the following device illustrated in Figs. 3 and 3a:

A' designates the dehydrating apparatus in which the alcohol at 96° Gay-Lussac and at a mean temperature of 70° C. is placed in contact during a certain number of hours with the quick lime.

At the outlet of the dehydrating apparatus is arranged a continuous decanting apparatus I. The density of the hydrated lime (1, 3 to 1, 4) being rather great relatively to pure alcohol (0,794), the separation is easily effected. The lime sludge falls in the lower cone J and issues through a valve controlled by the hand-wheel $j$: it then enters the continuous rectifying apparatus K, L, for obtaining the recuperation of the alcohol. As previously, the flowing of this thick sludge is facilitated by addition of tepid water (from the vessel Y and inlet branch $y$).

The limpid alcohol floats at the surface and enters into the still Z, heated by a steam double-bottom $z$.

As this alcohol, although limpid, still contains some traces of lime, a precipitation of this lime is effected by degrees on the heating surface. This is noticed by the diminution of the power of distillation.

It suffices then to stop the feeding of the still and to exhaust it up to dryness. This being done, the cleaning can be effected, either by opening the cover so as to be able to take off the scales by hand, or in a simpler manner by introducing through the hole Z' water to which has been added a small quantity of hydrochloric acid for dissolving the deposit.

Once the dissolution is terminated, the liquid is emptied through the lower cock $Z^2$, the still is rinsed, dried by passing steam through the double bottom and the distilling operation can be again effected.

The other operations are carried out as previously.

The new method of operation has however this advantage that the distillation being effected on a nearly limpid liquid, the drawing along of colloidal lime is no longer to be feared, this colloidal lime soiling the alcohol in an almost irremediable manner, unless resorting to a second distillation.

Claims.

1. The continuous process for the production of absolute alcohol in large quantities by dehydration by means of a solid dehydrating agent, which consists essentially in intimately mixing alcohol of 95/96° Gay-Lussac in the state of liquid with the dehydrating agent in the form of powder, subjecting the mixture to distillation, collecting the absolute alcohol, withdrawing from the still the residual liquid mixture when partially deprived of its alcohol, diluting the mixture with water and subjecting the diluted mixture to distillation and rectification to exhaust it of alcohol and to obtain an alcoholic distillate of 96° adapted to be subjected to dehydration.

2. A process for the production of absolute alcohol which comprises treating a mixture of alcohol and water with a dehydrating agent, distilling off a portion of the alcohol from the mixture, diluting the residual portion, resulting from said distillation, with water and distilling the diluted residual portion so as to obtain a distillate of aqueous alcohol for the said dehydrating step.

3. A process for the production of absolute alcohol which comprises treating a mixture of alcohol and water with a solid dehydrating agent, distilling off a portion of the alcohol from the mixture, collecting the distilled alcohol, diluting the residual portion of the mixture with water, distilling and rectifying the same so as to exhaust said mixture of alcohol and obtain a distillate of aqueous alcohol for the said dehydrating step.

In testimony whereof I have signed my name to this specification.

EMILE AUGUSTIN BARBET.